(12) United States Patent
Weiglein et al.

(10) Patent No.: US 10,161,449 B2
(45) Date of Patent: Dec. 25, 2018

(54) SPLIT BEARING CAGE

(71) Applicant: Aktiebolaget SKF, Gothenburg (SE)

(72) Inventors: Juergen Weiglein, Oerlenbach (DE); Franziska Meyer, Schweinfurt (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 15/637,014

(22) Filed: Jun. 29, 2017

(65) Prior Publication Data
US 2018/0003230 A1   Jan. 4, 2018

(30) Foreign Application Priority Data
Jun. 30, 2016   (DE) .......................... 10 2016 211 908

(51) Int. Cl.
*F16C 33/38*  (2006.01)
*F16C 19/26*  (2006.01)
(Continued)

(52) U.S. Cl.
CPC ...... *F16C 33/3862* (2013.01); *F16C 33/3875* (2013.01); *F16C 33/3887* (2013.01); *F16C 33/4635* (2013.01); *F16C 33/516* (2013.01); *F16C 2208/00* (2013.01); *F16C 2208/02* (2013.01); *F16C 2220/04* (2013.01); *F16C 2226/62* (2013.01); *F16C 2226/74* (2013.01); *F16C 2300/02* (2013.01)

(58) Field of Classification Search
CPC .. F16C 19/26; F16C 33/3862; F16C 33/3878; F16C 33/3887; F16C 33/4635; F16C 33/4682; F16C 33/4694; F16C 33/516; F16C 2208/02; F16C 2208/20; F16C 2220/02; F16C 2220/04; F16C 2300/02; F16C 2226/74
USPC ....... 384/530, 535–536, 539, 542, 576, 582, 384/572, 578
See application file for complete search history.

(56) References Cited

U.S. PATENT DOCUMENTS 939,056 A * 11/1909 Michaud ................. F16C 33/52
                                                           384/578
1,966,775 A *  7/1934 Weis ....................... F16C 19/28
                                                           384/578
(Continued)

FOREIGN PATENT DOCUMENTS

DE           2041342 A1 *  2/1972 .......... F16C 33/4635
DE    102010037331 A1 *  3/2012 ............ F16C 33/504
(Continued)

*Primary Examiner* — Marcus Charles
(74) *Attorney, Agent, or Firm* — Bryan Peckjian; SKF USA Inc. Patent Dept.

(57) ABSTRACT

A split bearing cage for a rolling-element bearing assembly includes a first bearing cage segment and a second bearing cage segment each having two side ring sections axially spaced apart by a plurality of bridges. Adjacent pairs of the bridges define rolling-element receiving pockets for receiving rolling elements of the rolling-element bearing assembly and for holding the rolling elements spaced apart from each other and for guiding the rolling elements. The first bearing cage segment is connected to the second bearing cage segment via a swivel joint that may be formed of a bolt element on a first end of the first bearing cage segment and an at least partial eyelet on the first end of the second bearing cage segment.

16 Claims, 1 Drawing Sheet

(51) Int. Cl.
  *F16C 33/46* (2006.01)
  *F16C 33/50* (2006.01)
  *F16C 33/51* (2006.01)

(56) References Cited

U.S. PATENT DOCUMENTS

| | | | | |
|---|---|---|---|---|
| 2,417,559 | A * | 3/1947 | Larson | F16C 19/381 |
| | | | | 193/37 |
| 4,708,498 | A * | 11/1987 | Labedan | F16C 27/066 |
| | | | | 384/560 |
| 8,888,373 | B2 * | 11/2014 | Mangold | F16C 25/08 |
| | | | | 384/470 |
| 8,894,293 | B2 * | 11/2014 | Beck | F16C 33/4694 |
| | | | | 384/577 |
| 9,249,832 | B2 * | 2/2016 | Friedrich | F16C 33/504 |
| 2004/0156571 | A1 * | 8/2004 | Kotani | F16C 19/463 |
| | | | | 384/580 |
| 2014/0301683 | A1 * | 10/2014 | Higdon | F16C 33/4629 |
| | | | | 384/447 |

FOREIGN PATENT DOCUMENTS

| | | | | | |
|---|---|---|---|---|---|
| DE | 102012203851 | A1 * | 9/2013 | | F16C 33/56 |
| EP | 1219843 | A2 * | 7/2002 | | F16C 33/4629 |
| JP | 2007247814 | A * | 9/2007 | | F16C 33/504 |
| JP | 2014211240 | A * | 11/2014 | | F16C 33/4611 |
| JP | 2016109142 | A * | 6/2016 | | F16C 43/06 |

* cited by examiner

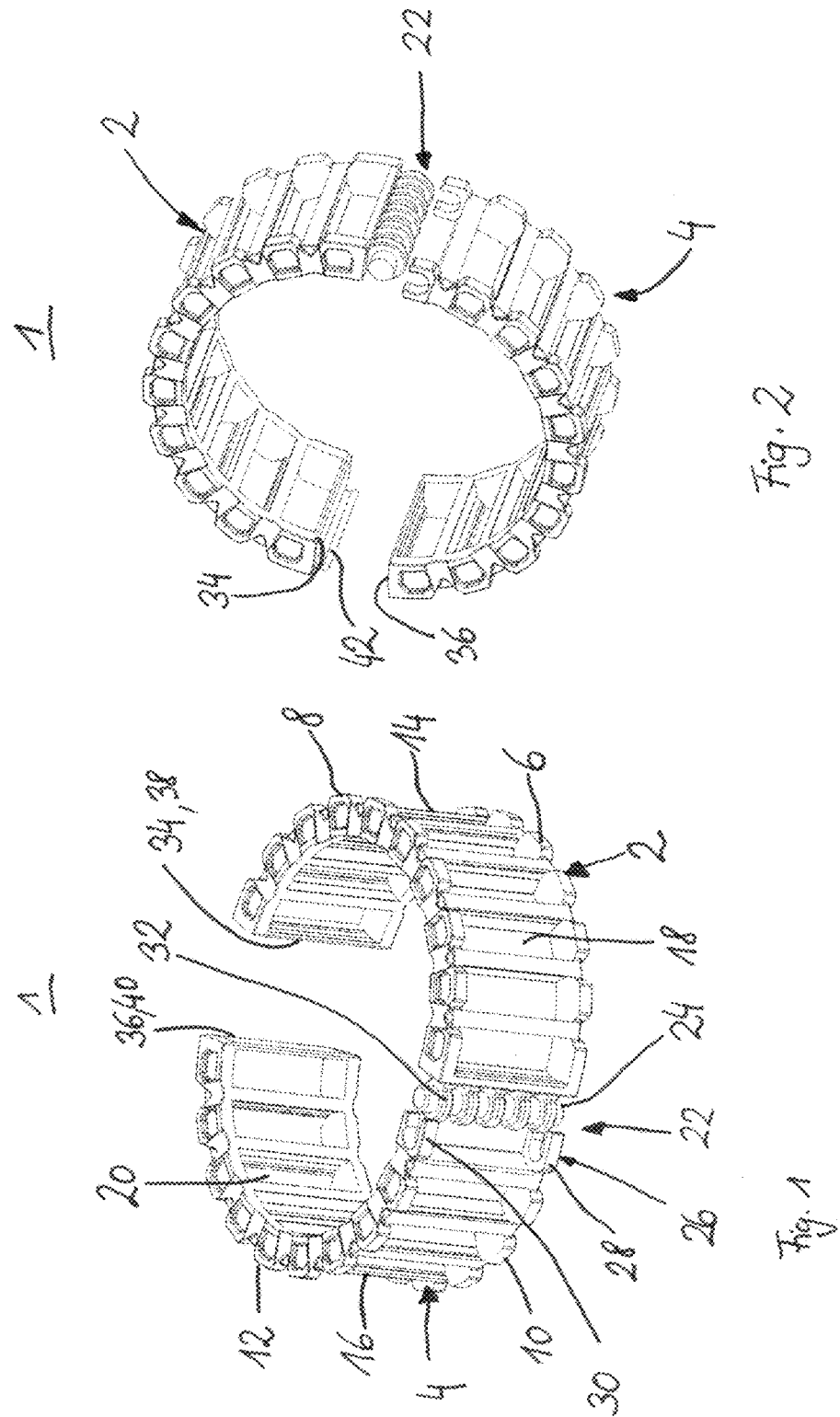

SPLIT BEARING CAGE

CROSS-REFERENCE

This application claims priority to German patent application no. 10 2016 211 908.7 filed on Jun. 30, 2016, the contents of which are fully incorporated herein by reference.

TECHNOLOGICAL FIELD

The present disclosure relates to a split bearing cage for a rolling-element bearing assembly that has at least one first and one second bearing cage segment, each segment having two side ring sections that are each spaced axially from each other via bridges, and between which bridges rolling-element receiving pockets are formed.

BACKGROUND

Bearing cages for rolling-element bearings generally comprise two side rings that are axially spaced from each other via bridges. The bridges here are disposed successively in a circumferential direction of the bearing cage and form pockets for receiving rolling elements. Such a bearing cage holds the rolling elements at a spacing due to their arrangement in the pockets, in order to make possible a better rolling behavior.

In operation, bearing cages are greatly stressed mechanically by friction-, shear-, and tensile-forces, and they are therefore generally configured one-piece and produced, for example, from steel plate.

However, if an axial mounting of the bearing cage to a bearing position is not possible, such as, for example, with roller-supported one-part crankshafts, which are usually constructed angled, then the use of one-part bearing cages is not possible.

Split bearing cages are known from the prior art for such bearing cages. However, it is disadvantageous with these bearing cages that in assembly they have a non-uniformly round outer contour, which leads to imbalances of the bearing cage in operation. Furthermore non-uniformly distributed forces thereby act on the bearing cage, with the result that a failure of the bearing cage and thus a total failure of the bearing may result.

SUMMARY

An aspect of the present disclosure is therefore to provide a split bearing cage that has an improved operating behavior and a longer service life.

In the following a split bearing cage for a rolling-element bearing assembly having at least one first and one second bearing cage segment is presented. Here each of the bearing cage segments has two side ring sections that are respectively spaced from each other axially via bridges, between which bridges rolling-element receiving pockets are formed. The rolling-element receiving pockets are configured to receive rolling elements of the rolling-element bearing assembly, to hold them spaced from one another, and to guide them.

In order to provide a split bearing cage having an improved operating behavior and a longer service life, it is provided that at least two bearing cage segments are connected to each other via a swivel joint. Here the size of the swivel joint is dimensioned such that it is adapted to the size of the rolling-element receiving pockets surrounding it. In comparison to the bearing cages known from the prior art, in the bearing cage in the assembled state uniformly dimensioned rolling-element receiving pockets can thereby be formed beyond the swivel joint. Thus the proposed bearing cage has a geometry corresponding to the one-part bearing cages. The imbalances occurring in operation can thereby be minimized, and the forces acting on the bearing cage can be better distributed. Furthermore, due to the split the bearing cage can also be pre-installed or installed at its intended bearing position even with limited installation space. The proposed split bearing cage is used in particular with one-part crankshafts, but of course other application cases are also possible with the disclosure.

According to one advantageous exemplary embodiment the swivel joint includes a bolt element and at least one eyelet element interacting with the bolt element. The at least two bearing cage segments can thereby be connected to each other in a simple manner during assembly. Here the bolt element has an axial axis about which the eyelet element is rotatably disposed in the assembled state. The eyelet element can be configured closed or open, wherein an open configuration is preferred. Furthermore, the bolt element and the eyelet element, as described more precisely farther below, are preferably configured such that in the assembled state of the bearing cage they substantially correspond to a rolling element to be received in the bearing cage, with the result that imbalances of the bearing cage can thereby be reduced. Furthermore, due to the presence of the bolt element, and the eyelet element interacting with the bolt element, a particularly fixed and stable connection can be ensured, particularly in operation of the bearing cage, with the result that the bearing cage segments do not fall apart. Here the bolt element is disposed on a cage-segment end of the first bearing cage segment, and the at least one eyelet element is disposed on a cage-segment end of the at least second bearing cage segment. The bolt element is preferably formed integrally with the bearing cage segment, however it is also possible in principle to form the bolt element separately and subsequently to attach or to connect it to the bearing cage segment using methods known from the art. Furthermore, the bolt element can be detachably or non-detachably connected to the eyelet element. Here a detachable connection offers the advantage of a simple disassembly.

According to a further advantageous exemplary embodiment the eyelet element is configured as a hook eyelet element that partially surrounds the bolt element. It is thereby possible during assembly to connect the bolt element to the eyelet element a simple manner, for example, by snapping-on. Here it is preferred when the hook eyelet element is configured with at least one, preferably two, snap hooks, which preferably project circumferentially in a region of the side ring sections. In this manner, with partial surrounding of the bolt element by the side ring sections of the first bearing cage segment the hook eyelet element, in particular the snap hook, can essentially form a common side ring section. Imbalances, in particular in a region of the connection of the at least two cage segments, can thereby be avoided and an improved running behavior of the bearing cage can be provided.

According to a further advantageous exemplary embodiment, alternatively to the hook eyelet element, the cage-segment end of the first bearing cage segment can include a first at least partial-ring-shaped eyelet element, and the cage-segment end of the second bearing cage segment can include a second at least partial-ring-shaped eyelet element, which are preferably connectable to each other by the bolt element. Due to this design a uniformly round outer contour of the bearing cage as well as a stable connecting of the at least two bearing cage segments can be ensured. Here in the assembled state the bolt element functions with the eyelet element as rolling element.

Furthermore, according to a further exemplary embodiment the bolt element can be configured axle-shaped including at least two annular ribs projecting from the bolt element. In operation a friction of the bolt element on the bearing rings can thereby be reduced, with the result that a smoother and improved running of the bearing elements is possible.

In one further preferred exemplary embodiment the swivel joint, in particular the bolt element, has at at least one point an outer diameter that is smaller than or equal to an outer diameter to be expected of the bearing cage including installed rolling elements. Additionally or alternatively at at least one point an outer contour of the swivel joint, in particular of the bolt element, has an outer contour that corresponds to a rolling element to be received in the bearing cage. Imbalances, in particular in operation of the bearing cage, can thereby be reduced and wear or bearing failure can be reduced or avoided. Furthermore, due to the reduced friction, the degree of efficiency, for example, of a crankshaft bearing, can be increased.

According to a further preferred exemplary embodiment, a cage-segment end of the first bearing cage segment and a cage-segment end of the second bearing cage segment include contact surface elements that are configured as bridge parts. Here with contact of the bearing cage segments the contact surface elements abut on each other and form a cage bridge. In the assembled state the bearing cage thereby also has the same bridge thickness at the mutually abutting contact surfaces as at the other bridges, with the result that also here the shape and dimensioning of the assembled bearing cage essentially corresponds to the shape and dimensioning of a one-part bearing cage. The running behavior can thereby also be improved.

In a further preferred exemplary embodiment the contact surface elements include contact surfaces that are configured complementary to each other, in particular concave-convex. Assembly inaccuracies can thereby be avoided and the two surfaces can be centered against each other, with the result that the cage segments are optionally configured with respect to each other.

In a further preferred exemplary embodiment the cage segment end of the first bearing cage segment includes a latching hook element that is designed to latch on the cage segment end of the second bearing cage segment. The at least two bearing cage segments can thereby be connected to each other in a simple manner, with the result that a self-supporting bearing cage can be provided for operation. Furthermore, larger forces can thereby act on the bearing cage. Here the cage-segment end of the second bearing cage segment can include at least one corresponding recess into which the latching hook element can engage. Preferably the latching hook element extends here, as a further preferred exemplary embodiment shows, essentially over the axial width of the bearing cage segment. A secure fixing of the first bearing cage segment on the second bearing cage segment can thereby be provided over the essentially entire axial width.

According to a further preferred exemplary embodiment the bearing cage is produced from an injection-moldable plastic, in particular from a fiber-reinforced injection-moldable plastic. Lightweight and easy-to-manufacture cages can be provided in mass production by injection molding. Moreover, the manufacturing via an injection-molding method makes possible a greater design freedom of the entire rolling-element bearing cage, with the result that the rolling properties and lubricant guiding properties of the cage can be optimized.

Further advantages and advantageous embodiments are specified in the description, the drawings, and the claims. Here in particular the combinations of features specified in the description and in the drawings are purely exemplary, so that the features can also be present individually or combined in other ways.

In the following the disclosure shall be described in more detail with reference to the exemplary embodiments depicted in the drawings. Here the exemplary embodiments and the combinations shown in the exemplary embodiments are purely exemplary and are not intended to define the scope of the disclosure. This scope is defined solely by the pending claims.

BRIEF DESCRIPTION OF THE DRAWINGS

FIG. 1 is a schematic perspective view of a split bearing cage according to an exemplary embodiment of the present disclosure.

FIG. 2 is a schematic perspective view of a split bearing cage according to a further exemplary embodiment of the present disclosure.

DETAILED DESCRIPTION

In the following, identical or functionally equivalent elements are designated by the same reference numbers.

FIGS. 1 and 2 each show a schematic perspective view of a split bearing cage 1 for a rolling-element bearing assembly (not shown) including a first and a second bearing cage segment 2, 4. Here in FIG. 2 an alternative design of the proposed split bearing cage 1 is depicted. Furthermore, each of the bearing cage segments 2, 4 includes two side ring sections 6, 8, 10, 12 that are each spaced from one another axially via bridges 14, 16, between which rolling-element receiving pockets 18, 20 are formed. The rolling-element receiving pockets 18, 20 are configured to receive rolling elements (not shown) of the rolling-element bearing assembly, to hold them spaced from one another, and to guide them.

In order to improve the operating behavior of the split bearing cage 1, in particular for use with one-part crankshafts, the two bearing cage segments 2, 4 are connected to each other via a swivel joint 22.

As shown in FIGS. 1 and 2, the swivel joint 22 includes a bolt element 24 and an eyelet element 26 interacting with the bolt element 24, via which the two bearing cage segments 2, 4 are connected to each other in a simple manner, with the result that the two bearing cage segments 2, 4 do not fall apart in operation. Here the bolt element 24 has an axial axis about which the eyelet element 26 is rotatably disposed in the assembled state (not shown). Furthermore, in the assembled state the bolt element 24 and the eyelet element 26 are configured and connected to each other such that they correspond to a rolling element to be received in the bearing cage 1. In comparison to the bearing cages known from the prior art, in the assembled state the bearing cage 1 can thereby have a shape and dimensioning corresponding to a one-part bearing cage, with the result that imbalances are reduced and the service live of the bearing cage 1 increases.

Furthermore, as depicted in FIGS. 1 and 2 the eyelet element can be configured as a hook eyelet element including two snap hooks 28, 30 that in the assembled state partially surround the bolt element 24. Here the two snap hooks 28, 30 circumferentially project in a region of the side ring sections 10, 12 of the second bearing cage segment 4, with the result that with partial surrounding of the bolt element 24 by the side ring sections 6, 8 of the first bearing cage segment 2 they form a common side ring section. Imbalances can thereby be reduced and an improved running behavior of the bearing cage 1 provided.

Furthermore, in FIGS. 1 and 2 it is shown that the bolt element 24 is configured axle-shaped including annular ribs 32, whereby a friction of the bolt element 24 with further bearing elements, in particular with the raceways of the bearing rings (not shown) is reducible, and the annular ribs 32 make possible a uniform sliding of the bearing cage. In order to avoid the further imbalances in the operation of the bearing cage, the annular ribs 32 of the bolt element 24 have at most an outer diameter that corresponds to an expected outer diameter of the bearing cage 1 with installed rolling elements. However, preferably the ribs do not radially project beyond a maximum radial extension of the bearing cage.

As shown in particular in the exemplary embodiment of FIG. 1, a cage-segment end 34 of the first bearing cage segment 2 and a cage-segment end 36 of the second bearing cage segment 4 each include contact surface elements 38, 40 that are configured as bridge parts. In the event of contact of the bearing cage segments 2, 4, the contact surface elements 38, 40 abut on each other and form a cage bridge. In the assembled state, even in the region of the contact surfaces the bearing cage 1 can thereby have a uniform bridge width of bridges 14, 16, as known from one-part bearing cages. Here the contact surface elements 38, 40 can have contact surfaces that are configured complementary to each other, in particular concave-convex, in order to avoid assembly inaccuracies and in order to center the two contact surfaces such that the cage segments 2, 4 are optimally configured with respect to each other.

Alternatively, as shown in particular in the exemplary embodiment of FIG. 2, the cage segment end 34 of the first bearing cage segment 2 can have a latching hook element 42 that is designed to latch on the cage segment end 36 of the second bearing cage segment 4. The two bearing cage segments 2, 4 can thereby be connected to each other in a simpler manner, with the result that a self-supporting bearing cage 1 can be provided. Here the latching hook element 42, as shown in FIG. 2, extends essentially over the axial width of the first bearing cage segment 2, with the result that a sufficient retaining force is provided even with large bearings.

Overall, the disclosed split bearing cage a bearing cage makes possible an improved operating behavior, with the result that the service life of the bearing cage and thus of the entire bearing increases. This is made possible by the split bearing cage including at least two bearing cage segments that are connected to each other via a swivel joint, and furthermore by a cage segment end of the first bearing cage segment and a cage segment end of the second bearing cage segment having contact-surface elements that abut on each other in the event of contact of the bearing cage segments and form a cage bridge. In the installed state of the bearing cage the same shape and dimensioning of the rolling-element receiving pockets and bridges can be provided as with a one-part bearing cage. In addition, the presented bearing cage can be used in a limited installation space, such as, for example with one-part crankshafts, however other application cases of the disclosure are of course also comprised.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved split bearing cages.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Split bearing cage
2, 4 Bearing cage segment
6, 8, 10, 12 Side ring section
14, 16 Bridge
18, 20 Rolling-element receiving pockets
22 Swivel joint
24 Bolt element
26 Eyelet element
28, 30 Snap hook
32 Annular ribs
34, 36 Cage segment end
38, 40 Contact surface element
42 Latching hook element

What is claimed is:

1. A split bearing cage for a rolling-element bearing assembly, the split bearing cage comprising: a first bearing cage segment and a second bearing cage segment each including two side ring sections axially spaced from one another by a plurality of bridges, adjacent pairs of the bridges defining rolling-element receiving pockets configured to receive rolling elements of the rolling-element bearing assembly and hold the rolling elements spaced apart from each other and to guide the rolling elements, wherein the first bearing cage segment is connected to the second bearing cage segment via a swivel joint, the swivel joint comprising a bolt element integrally formed with the first bearing cage element and an eyelet which is integrally formed with the second bearing cage element, the bolt element extending in the axial direction, the eyelet being configured open and being detachably engageable with the bolt element, wherein the bolt element has a longitudinal axis and comprises a plurality of annular ribs which extend outwardly therefrom, the plurality of annular ribs having an outer diameter equal to an outer diameter to be expected of the bearing cage with installed rolling elements.

2. The split bearing cage according to claim 1, wherein the swivel joint includes a second eyelet.

3. The split bearing cage according to claim 2, wherein the bolt element is axle-shaped and has two projecting annular ribs.

4. The split bearing cage according to claim 2, wherein when the split bearing cage is assembled and the first bearing cage segment is fully engaged with the second bearing cage segment, the swivel joint occupies the same amount of space as a rolling element.

5. The split bearing cage according to claim 2, wherein the eyelet element is a hook eyelet element that partially surrounds the bolt element.

6. The split bearing cage according to claim 5,
   wherein a second cage segment end of the first bearing cage segment and a second cage segment end of the second bearing cage segment each include contact surface elements that are configured to form a bridge part when they touch, and
   wherein the contact surface element of the second cage segment end of the first bearing cage segment is convex and the contact surface element of the second cage segment end of the second bearing cage segment is concave.

7. The split bearing cage according to claim 1, wherein when the split bearing cage is assembled and the first bearing cage segment is fully engaged with the second bearing cage segment, the swivel joint occupies the same amount of space as a rolling element.

8. The split bearing cage according to claim 7, wherein the first bearing cage segment and the second bearing cage segment are manufactured from a fiber-reinforced injection-moldable plastic.

9. The split bearing cage according to claim 8, wherein when the split bearing cage is assembled and the first bearing cage segment is fully engaged with the second bearing cage segment, the swivel joint occupies the same amount of space as a rolling element.

10. The split bearing cage according to claim 9, wherein a second cage segment end of the first bearing cage segment and a second cage segment end of the second bearing cage segment each include contact surface elements that are configured to form a bridge part when they touch.

11. The split bearing cage according to claim 1, wherein a second cage segment end of the first bearing cage segment and a second cage segment end of the second bearing cage segment each include contact surface elements that are configured to form a bridge part when they touch.

12. The split bearing cage according to claim 11, wherein the contact surface element of the second cage segment end of the first bearing cage segment is complementary to the second cage segment end of the second bearing cage segment.

13. The splint bearing cage according to claim 12, wherein the contact surface element of the second cage segment end of the first bearing cage segment is convex and the contact surface element of the second cage segment end of the second bearing cage segment is concave.

14. The split bearing cage according to claim 11, wherein the second cage segment end of the first bearing cage segment includes a latching hook configured to latch to the second cage segment end of the second bearing cage segment.

15. The split bearing cage according to claim 14, wherein the latching hook extends substantially over the axial width of the first bearing cage segment.

16. The split bearing cage according to claim 1, wherein the first bearing cage segment and the second bearing cage segment are manufactured from a fiber-reinforced injection-moldable plastic.

* * * * *